3,291,586
SOLDER GLASS COMPOSITIONS AND METHOD OF SEALING THEREWITH

George C. Chapman, Jr., and Kenneth M. Henry, Toledo, Ohio, assignors to Owens-Illinois, Inc., a corporation of Ohio
No Drawing. Filed Apr. 16, 1963, Ser. No. 273,308
11 Claims. (Cl. 65—33)

This invention relates to new solder glasses of the devitrifiable type which have improved properties, and to a method of sealing therewith.

It has been noted that devitrifiable solder glasses, in contrast to vitreous solder glasses, do not have the capability of re-softening at their original fiber softening points after they have once been employed as a sealant and devitrifiable solder glass will break or separate if the seal is heated to temperatures ranging from 960° F. to 990° F. upon the application of a slight tensile force. In the opening of certain sealed articles such as color television tubes, it is highly desirable to effect this opening at temperatures as low as possible. Although devitrifiable solder glasses produce strong seals between the funnel and face plate members of the television tube, it has been found that whenever it is desired to reopen the tube the use of temperatures ranging from 960°–990° F., which have been found necessary to effect the reopening, has deleterious effects on the tube itself including the setting up of undesirable strains within the television tube envelope and the damaging of the phosphor coating of the face plate. Accordingly, it would be highly desirable to the industry to provide seals in composite articles made of devitrifiable solder glasses which would soften sufficiently at relatively low temperatures so as not in injure or damage the articles and yet permit separation at the seal.

It is, therefore, an object of this invention to provide novel devitrifiable solder glass compositions characterized by having lower softening points.

It is a further object to provide novel devitrifiable solder glass compositions in which seals made therefrom may be separated at lower temperatures than heretofore possible and without the formation of undesirable side effects.

A further object of this invention is to provide novel devitrifiable solder glass compositions in which seals made therefrom may not only be separated at lower temperatures but also with a concomitant reduction of the tensile stress in the seal area.

A further object of this invention is to provide a novel method of glass sealing involving a mixture of finely divided vitreous and devitrifiable glasses. These and other objects of this invention will become apparent from the description hereinafter.

The novel compositions of this invention comprise compounding a mixture of vitreous and devitrifiable solder glasses, each of which is finely divided or ground and in which the latter ranges from 25 to 75% of the entire composition. In general, it can be said that these ranges of mixtures represent usable formulations. However, more satisfactory ranges include the use of about 50% or less of the devitrifiable solder glass while the optimum mixture contemplates the use of about 50% of the devitrifiable solder glass where, in each instance above, the balance of the mixture is a vitreous solder glass.

The present invention will be more completely understood by reference to the following examples. In each instance, all parts and percentages are by weight unless otherwise specified.

EXAMPLE I

The sealing edges of the face plate and funnel for a television tube were ground and cleaned with acetone. Thereafter a solder glass consisting substantially of a ground devitrifiable glass designated as D–1, described below, was mixed with a vehicle of nitrocellulose and amyl acetate to the consistency of paste and applied to the sealing edge of the funnel by means of a metal squeeze tube. The cold applied solder was allowed to set up after which the face plate edge was placed on it and aligned. Alignment was maintained by a fixture. The funnel and face plate members were sealed during which the members were heated at a high rate of about 20° F./minute without a heat shield and soaking at 800° F. (423° C.) for 60 minutes. The resulting bulb was then cooled to room temperature at the rate of approximately 10° F./minute.

The procedure for opening the bulb was as follows:

(a) Bulb was evacuated to approximately 27" Hg.
(b) Bulb was heated to 800° F. at approximately 5° F./minute.
(c) Vacuum was released at 800° F.
(d) Seal area temperature was raised to approximately 990° F. by calrod heater.
(e) Bulb was suspended ⅛" and seal area held at 990° F. until parts separated.
(f) Bulb temperature held at 880° F. and seal area held at 990° F. until parts separated.
(g) Calrod heater turned off when parts separated and seal area allowed to come to equilibrium with the bulb.
(h) Entire bulb was then cooled at approximately 3° F./minute to 750° F. at which time the cooling rate was increased to 10° F./minute.

In the case of D–1 devitrifiable glass being used as the sealing glass for the funnel and face plate, it was found that the television bulb opened at the seal when the bulb temperature was 880° F. after 20 minutes and the seal was at a temperature of 990° F. for 15 minutes.

EXAMPLE II

The procedure of Example I was repeated with opening of the television bulb at the seal area except the ground devitrifiable glass was D–2 and bulb temperature was at 880° F. for 25 minutes and the seal temperature was 990° F. for 20 minutes.

EXAMPLE III

The procedure of Example II was repeated and with the same results with respect to opening except the ground devitrifiable solder glass was D–3. The bulb and seal temperatures were the same except the time interval was 30 minutes for the bulb and 15 minutes for the seal.

EXAMPLE IV

The procedure of Example I was substantially repeated except that the solder glass seal consisted of 75% of a ground vitreous glass (V–1) and 25% of a ground devitrifiable glass (D–1). The seal of the bulb opened when the temperature reached 860° F.

EXAMPLE V

The procedure of Example I was repeated except that the solder glass consisted of 50% of a ground vitreous glass (V–1) and 50% of a ground devitrifiable glass (D–1). The seal of the bulb opened after heating to 900° F. for 30 minutes.

EXAMPLE VI

The procedure of Example V was repeated except that the solder glass consisted of 25% of a ground vitreous glass (V–2) and 75% of a ground devitrifiable glass (D–2). The seal of the bulb opened when the temperature reached 930° F.

Compositions of the vitreous and devitrifying solder glasses, referred to above and others useful in the present process, are as follows in terms of percent by weight:

*Table I*

| Component | Viterous Glass | | | | |
|---|---|---|---|---|---|
| | V-1 | V-2 | V-3 | V-4 | V-5 |
| $SiO_2$ | 2.1 | 3 | | 3 | 3 |
| $B_2O_3$ | 15.4 | 13 | 14 | 13 | 18 |
| PbO | 71.1 | 72 | 70 | 72 | 68 |
| ZnO | 9.5 | 9 | 11 | 9 | 8 |
| CuO | 1.9 | 3 | 5 | 3 | 3 |
| BaO | | | | | |
| $Al_2O_3$ | | | | | |

*Table II*

| Component | Devitrifying Glass | | |
|---|---|---|---|
| | D-1 | D-2 | D-3 |
| PbO | 72.72 | 74.77 | 72.77 |
| $B_2O_3$ | 8.45 | 8.45 | 8.45 |
| ZnO | 12.83 | 12.83 | 10.83 |
| CuO | | | 4.01 |
| BaO | 4.00 | 2.00 | 2.00 |
| $SiO_2$ | 2.00 | 2.00 | 2.00 |

In general, it was observed that, in order to effect opening of the bulbs, the temperatures of the seal area were as follows when the solder glass consisted of vitreous and devitrifying glasses and the latter component varied from 25 to 100% by weight:

*Table III*

| Solder Glass | Vitreous Component, percent | Devitrifying Component, percent | Opening Temperature, °F. |
|---|---|---|---|
| 1 | 75 | 25 | 860-880 |
| 2 | 50 | 50 | 900 |
| 3 | 25 | 75 | 920-930 |
| 4 | | 100 | 960-990 |

A range of vitreous solder glasses which has been found suitable for use in the present invention have compositions consisting essentially of the following components in the following proportions:

*Table IV*

Component: Weight percent
$SiO_2$ ---- 0-6
$B_2O_3$ ---- 8-21
PbO ---- 70-84
ZnO ---- 0-11
CuO ---- 0-6
$Al_2O_3$ ---- 0-3

In addition, the ratio of $(B_2O_3+SiO_2)$ to ZnO is at least 1.5 and the sum of $PbO+ZnO+B_2O_3+SiO_2$ is at least 90 weight percent.

One preferred range of vitreous solder glass compositions comprise the following:

*Table V*

Component: Weight percent
$SiO_2$ ---- 0-6
$B_2O_3$ ---- 13-21
PbO ---- 67-73
ZnO ---- 1-11
CuO ---- 0-6

Again, the ratio of $(B_2O_3+SiO_2)$ to ZnO is at least 1.5 and the sum of $PbO+ZnO+B_2O_3+SiO_2$ is at least 90 weight percent.

A range of devitrifiable solder glasses which has been found suitable to mix with the vitreous glass component to compound the new glass formulations of this invention are given below. These glasses can be devitrified by heating at a temperature from 400 to 450° C. for a period of from ½ to 1 hour, and are composed essentially of the components and amounts set forth in Table VI:

*Table VI*

Component: Weight percent
$SiO_2$ ---- 1-3
$B_2O_3$ ---- 7-10
PbO ---- 70-80
ZnO ---- 7-14
BaO ---- 0-8
CuO ---- 0-8 and the ratio of $(B_2O_3+SiO_2)$ to ZnO is less than 1.3. In addition, the $SiO_2+PbO+B_2O_3+ZnO$ equals at least 90 weight percent of the compositions.

It is to be understood that the specific examples of vitreous solder glasses (Table I above) and devitrifiable solder glasses (Table II above) plus the range of vitreous solder glasses (Tables IV and V above) and the range of devitrifiable glasses (Table VI above) set forth are merely by way of illustration and are not to be construed as limitative since the present invention is applicable to vitreous and devitrifiable glasses, as defined above, in general. Accordingly, other vitreous and devitrifiable solder glasses which may have substantially similar compositions than those referred to above can be employed in the invention herein disclosed.

It was found that satisfactory results, namely, a lower opening temperature as evidenced by Examples IV-VI above, are not obtained if the vitreous and devitrifying solder glasses are used in the same proportions but are just melted into a single solder glass and the resulting solder glass is then ground up and made into a paste by using nitrocellulose and amyl acetate as the binder and applied in the manner as disclosed in Example I above.

In addition, it was also found that the use of the solder glasses of this invention consisting of vitreous and devitrifying solder glasses resulted in the reduction of the tensile stress in the seal area when compared to seals which were made of 100% vitreous solder glass. By way of illustration, it was noted in connection with Example VI that the tensile stress in the seal area, as measured optically as a deviation from a standard norm, after the evacuation cycle and vacuum release, was only 30 millimicrons of retardation compared to 140 millimicrons of retardation for seals made with 100% vitreous solder glass.

As is well known, when sealing two surfaces with a particulate solder glass, it is necessary to heat the solder glass in contact with the parts to be sealed at a temperature high enough above the fiber softening point so that the glass will flow to make a good seal and wet the surfaces being sealed. In employing a devitrifiable solder glass heating is then continued for sufficient time at the sealing temperature to devitrify the solder glass. As is also well known, virtually all glasses can be devitrified under some time-temperature conditions. As used herein, a devitrifiable solder or sealing glass means a glass that will devitrify under the conditions of time and temperature employed in making a seal, while a vitreous solder glass is a stable solder glass and does not devitrify under the same conditions employed to make the seal.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equiva-

What we claim is:

1. A solder glass comprising a vitreous solder glass ranging from 25 to 75% by weight and a devitrifiable solder glass ranging from 75 to 25% by weight.

2. A solder glass comprising a vitreous solder glass ranging from 25 to 50% by weight and a devitrifiable solder glass ranging from 50 to 75% by weight.

3. A solder glass comprising substantially 75% by weight of a vitreous solder glass and 25% by weight of a devitrifiable solder glass.

4. The solder glass of claim 1 in which the vitreous solder glass has the following range in composition by weight:

| | Percent |
|---|---|
| $SiO_2$ | 0–6 |
| $B_2O_3$ | 8–21 |
| PbO | 70–84 |
| ZnO | 0–11 |
| CuO | 0–6 |
| $Al_2O_3$ | 0–3 | with the sum of PbO, ZnO, $B_2O_3$, and $SiO_2$ being at least 90% while the ratio of ($B_2O_3$+$SiO_2$) to ZnO is at least 1.5, and the devitrifiable solder glass has the following range in composition by weight:

| | Percent |
|---|---|
| $SiO_2$ | 1–3 |
| $B_2O_3$ | 7–10 |
| PbO | 70–80 |
| ZnO | 7–14 |
| BaO | 0–8 |
| CuO | 0–8 | with the sum of PbO, ZnO, $B_2O_3$, and $SiO_2$ being at least 90% while the ratio of ($B_2O_3$+$SiO_2$) to ZnO is less than 1.3.

5. The solder glass of claim 2 in which the vitreous solder glass has the following range in composition by weight:

| | Percent |
|---|---|
| $SiO_2$ | 0–6 |
| $B_2O_3$ | 8–21 |
| PbO | 70–84 |
| ZnO | 0–11 |
| CuO | 0–6 |
| $Al_2O_3$ | 0–3 | with the sum of PbO, ZnO, $B_2O_3$, and $SiO_2$ being at least 90% while the ratio of ($B_2O_3$+$SiO_2$) to ZnO is at least 1.5, and the devitrifiable solder glass has the following range in composition by weight:

| | Percent |
|---|---|
| $SiO_2$ | 1–3 |
| $B_2O_3$ | 7–10 |
| PbO | 70–80 |
| ZnO | 7–14 |
| BaO | 0–8 |
| CuO | 0–8 | with the sum of PbO, ZnO, $B_2O_3$, and $SiO_2$ being at least 90% while the ratio of ($B_2O_3$+$SiO_2$) to ZnO is less than 1.3.

6. The solder glass of claim 3 in which the vitreous solder glass has the following range in composition by weight:

| | Percent |
|---|---|
| $SiO_2$ | 0–6 |
| $B_2O_3$ | 8–21 |
| PbO | 70–84 |
| ZnO | 0–11 |
| CuO | 0–10 |
| $Al_2O_3$ | 0–3 | with the sum of PbO, ZnO, $B_2O_3$, and $SiO_2$ being over 90% while the ratio of ($B_2O_3$+$SiO_2$) to ZnO is at least 1.5, and the devitrifiable solder glass has the following range in composition by weight:

| | Percent |
|---|---|
| $SiO_2$ | 1–3 |
| $B_2O_3$ | 7–10 |
| PbO | 70–80 |
| ZnO | 7–14 |
| BaO | 0–8 |
| CuO | 0–8 | with the sum of PbO, ZnO, $B_2O_3$, and $SiO_2$ being at least 90% while the ratio of ($B_2O_3$+$SiO_2$) to ZnO is less than 1.3.

7. A method of forming a seal comprising applying a mixture of two finely divided sealing glasses to surfaces to be joined together, the sealing glasses being vitreous sealing glass and a devitrifiable sealing glass, heating said mixture to a temperature at which they flow and form a seal, and thereafter maintaining the mixture at an elevated temperature at which the devitrifiable glass devitrifies and the vitreous glass does not devitrify.

8. A method of forming a seal comprising applying a mixture of two finely divided sealing glasses to surfaces to be joined together, the sealing glasses being vitreous sealing glass and a devitrifiable sealing glass, heating said mixture to a temperature of about 800° F. so as to form a seal, and thereafter maintaining this elevated temperature for about 60 minutes during which the devitrifiable glass devitrifies and the vitreous glass does not devitrify.

9. The solder glass of claim 1 in which the vitreous solder glass has the following range in composition by weight:

| | Percent |
|---|---|
| $SiO_2$ | 0–6 |
| $B_2O_3$ | 13–21 |
| PbO | 67–73 |
| ZnO | 1–11 |
| CuO | 0–6 | the sum of PbO, ZnO, $B_2O_3$, and $SiO_2$ being at least 90% while the ratio of ($B_2O_3$+$SiO_2$) to ZnO is at least 1.5, and the devitrifiable solder glass has the following range in composition by weight:

| | Percent |
|---|---|
| $SiO_2$ | 1–3 |
| $B_2O_3$ | 7–10 |
| PbO | 70–80 |
| ZnO | 7–14 |
| BaO | 0–8 |
| CuO | 0–8 | with the sum of PbO, ZnO, $B_2O_3$, and $SiO_2$ being at least 90% while the ratio of ($B_2O_3$+$SiO_2$) to ZnO is less than 1.3.

10. A method according to claim 7 wherein the said solder glass is a mixture of vitreous and devitrifiable solder glasses recited in claim 4.

11. A method according to claim 7 wherein the said solder glass is a mixture of vitreous and devitrifiable solder glasses recited in claim 9.

References Cited by the Examiner

UNITED STATES PATENTS

| 2,693,668 | 11/1954 | Slayter | 106—53 |
| 2,889,952 | 6/1959 | Claypoole | 106—53 |
| 2,951,167 | 8/1960 | Kegg et al. | 106—39 |
| 3,061,664 | 10/1962 | Kegg | 106—53 |

HELEN M. McCARTHY, *Acting Primary Examiner.*